United States Patent [19]

Adams et al.

[11] Patent Number: 5,186,490
[45] Date of Patent: Feb. 16, 1993

[54] DRIVER COVER INTEGRAL HORN SWITCH WITH SOLID REINFORCEMENT STRUCTURE

[75] Inventors: Gary V. Adams, Brigham City; Davin G. Saderholm, Salt Lake City, both of Utah

[73] Assignee: Morton International, Inc., Chicago, Ill.

[21] Appl. No.: 764,017

[22] Filed: Sep. 23, 1991

[51] Int. Cl.⁵ .............................................. B60R 21/16
[52] U.S. Cl. ..................................... 280/731; 280/743
[58] Field of Search ................ 280/728, 731, 743, 732

[56] References Cited

U.S. PATENT DOCUMENTS

| | | | |
|---|---|---|---|
| 4,325,568 | 4/1982 | Clark et al. | 280/731 |
| 5,002,306 | 3/1991 | Miramitsu et al. | 280/731 |
| 5,062,661 | 11/1991 | Winget | 280/731 |
| 5,085,462 | 2/1992 | Gualtier | 280/731 |

Primary Examiner—Kenneth R. Rice
Attorney, Agent, or Firm—Gerald K. White

[57] ABSTRACT

The cover for an inflatable occupant restraint system for a motor vehicle contains a slot in the upper wall thereof into which a thin or membrane type switch assembly is inserted. The slot in the cover is positioned between a soft outer cover material (such as urethane, vinyl or polyester) and a solid reinforcement material (such as molded thermoplastic material). The solid reinforcement material provides for the slot into which to insert the switch and also for positioning and support of the switch, and in addition, for another slot through which electrical leads to the switch are inserted. The solid reinforcement material also provides for cover strength, as well as the cover rigidity that is required to provide a reaction surface for switch actuation.

13 Claims, 2 Drawing Sheets

DRIVER COVER INTEGRAL HORN SWITCH WITH SOLID REINFORCEMENT STRUCTURE

BACKGROUND OF THE INVENTION

1. Field of the Invention

This invention relates to a motor vehicle horn blowing switch arrangement, on the steering wheel of which vehicle an inflatable occupant restraint system is mounted.

2. Description of the Prior Art

Horn blowing switch arrangements have been proposed in the prior art for vehicles on the steering wheels of which inflatable occupant restraint systems are mounted. U.S. Pat. No. 3,819,205 discloses a so-called modular occupant restraint system in which an inflator, an inflatable cushion or air bag, and a generally rectangular cover or container for the cushion are all assembled on a support plate which, in turn, is mounted to the steering wheel. Extending from each upper corner of the cover is a portion which is provided with a horn blowing switch of the finger deflectable or pressure actuated push button type. A problem with this arrangement is that when access to the switches for repair or replacement is necessary, the cover must be disassembled from the support plate before the switches are exposed.

U.S. Pat. No. 4,148,503 discloses a similar occupant restraint system wherein the horn blowing switch comprises four horn blowing push buttons installed on the four spoke portions, respectively, of the steering wheel externally of the cover for the occupant restraint system.

U.S. Pat. No. 4,325,568 discloses a similar modular occupant restraint system assembled to a support plate having laterally extending pairs of arms and a horn blowing switch which is releasably pivotally connected to one arm and releasably secured to the other arm, with the switch being exposed for repair or replacement without disassembly of any of the components of the system. Spoke extensions of the steering wheel are horn buttons which actuate the switch.

U.S. Pat. No. 4,785,144 discloses a modular occupant restraint system in which a horn blowing switch is actuated when the module cover is depressed. The horn blowing switch includes a support that is mounted within the hub portion of the steering wheel and is provided with a plurality of bolts each of which supports a sleeve member. The bolts thread into the inflatable restraint module. Springs between the support and restraint module space the sleeves from the support. Depression of the module engages the sleeve members with the support to complete the circuit to blow the horn. Access to the switch for repair and replacement requires disassembly of the module. Another problem is that the avoidance of the effects of vibration on the module, transmitted from the steering wheel, requires the use of relatively strong springs. This, in turn, requires a relatively strong pressing force on the module in order to operate the horn.

U.S. Pat. No. 4,002,306 discloses an occupant restraint system having a plurality of membrane switches of plane rectangular shape applied to and arranged on the upper surface of the upper wall of a soft synthetic resin pad of a steering wheel, except for a break-open area defined by a thinned breaking portion in H-like shape, with the manner of attachment of the switches to the pad not being specified. It is contemplated that the membrane switches may be arranged on the rear surface of the upper wall of the pad. There are several disadvantages with these arrangements. The soft synthetic resin pad is rather deficient in respect of providing a suitable reaction surface for horn switch actuation. Servicing or replacement of the switches necessarily involves exposing internal components of the air bag module assembly, particularly in the case of applying the switches to the rear of the pad, and probably also when the switches are applied to the upper surface thereof because of the probability of damaging the pad when attempting to remove the switches for repair or replacement. Additionally, the arrangement of the lead wires from the membrane switches along side wall portions of the pad to a horn actuating circuit within the vehicle, as illustrated and described, leaves much to be desired in an occupant restraint system that is expected to be operable over the life of the vehicle which may be ten (10) years or more.

All of the horn blowing switch arrangements provided for use with inflatable occupant restraint systems mounted on the steering wheel of vehicles disclosed in the foregoing U.S. patents are disadvantageous in one respect or another. U.S. Pat. Nos. 3,819,205, 4,148,503, and 4,325,568 involve the pressing of buttons that are located adjacent the rim of the steering wheel While U.S. Pat. No. 4,785,144 provides actuation of the horn blowing switch when the restraint system module is given a strong push, the structure is complicated and costly to manufacture, and moreover, does not allow access to the switch for repair and replacement without disassembly of the restraint module In U.S. Pat. No. 5,002,306 actuation of the horn blowing switches requires weak pushing only of the pad but inherently appears to be subject to a number of disadvantages including difficulty when attempting repair or replacement of the switches tending to result in damage to the pad or exposure of the internal components of the restraint module, or interference with the use of a decorative cover for the pad.

Thus there is a need for improvement in horn blowing switch arrangements for vehicles on the steering wheels of which inflatable occupant restraint systems are mounted. The present invention was devised to fill the gap that has existed in the art in this respect.

SUMMARY OF THE INVENTION

An object of the invention is to provide an improved horn blowing switch arrangement for use on a vehicle steering wheel on which an inflatable occupant restraint system is mounted.

Another object of the invention is to provide an occupant restraint module cover integral horn switch and solid reinforcement structure for a vehicle that is operative to effect actuation of the horn by pressing on the module cover rather than by pressing buttons located elsewhere.

A further object of the invention is to provide a driver cover integral horn switch and solid reinforcement structure for an inflatable air bag occupant restraint module that allows for the installation and servicing of the horn switch assembly without exposing the air bag and without removal of the decorative cover that is provided on the occupant restraint module.

In accomplishing these and other objectives of the invention, there is provided, in accordance with the invention, a box-like cover or container for an inflatable occupant restraint module, which cover contains a cavity or slot into which a horn switch assembly is inserted. The horn switch is securely attached to the cover by means of bolts that are threaded into nuts which are molded in a solid reinforcement portion of the cover.

More particularly, the invention involves such a module cover which contains a slot or cavity into which a thin or membrane type horn switch assembly is inserted. The slot in the module cover is positioned between a soft outer cover material which may be comprised of urethane, vinyl or polyester, and a solid reinforcement material such as injection molded thermoplastic material. The solid reinforcement material provides for a slot or cavity means into which the thin membrane switch and electrical leads therefor may be inserted and also for positioning and support of the switch. Additionally, the solid reinforcement material provides for improvement in cover strength, as well as the cover rigidity required to provide an improved reaction surface for horn switch actuation and improvement in the "feel" of the switch operation when actuated.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification in which like parts are designated by the same reference numbers, and of which.

DESCRIPTION OF THE PREFERRED EMBODIMENT

Figure 1:
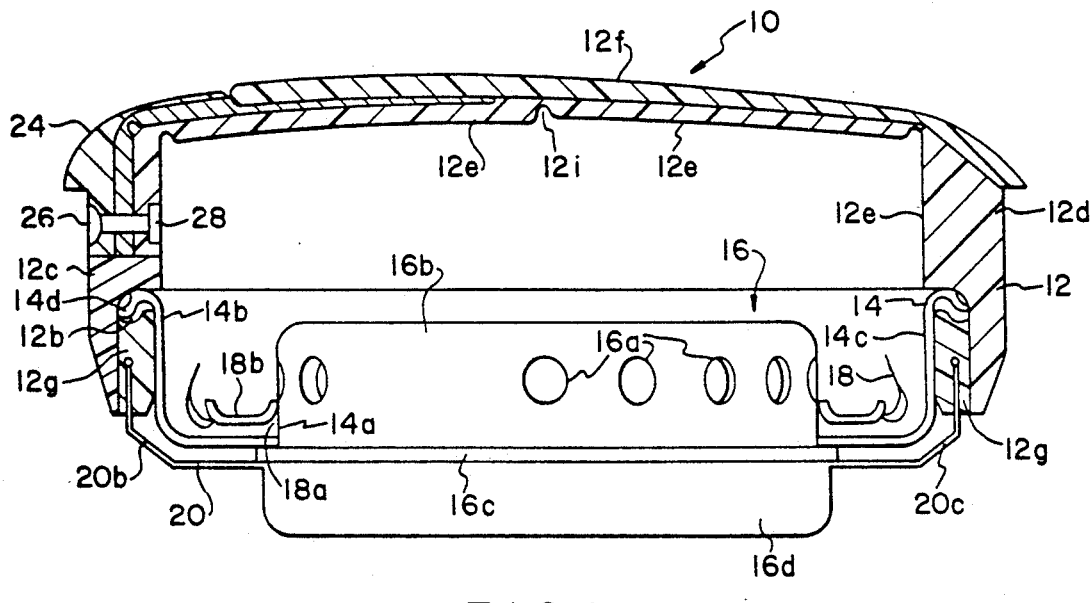
FIG. 1 is a side view section of a modular occupant restraint system embodying the invention.
Figure 2:
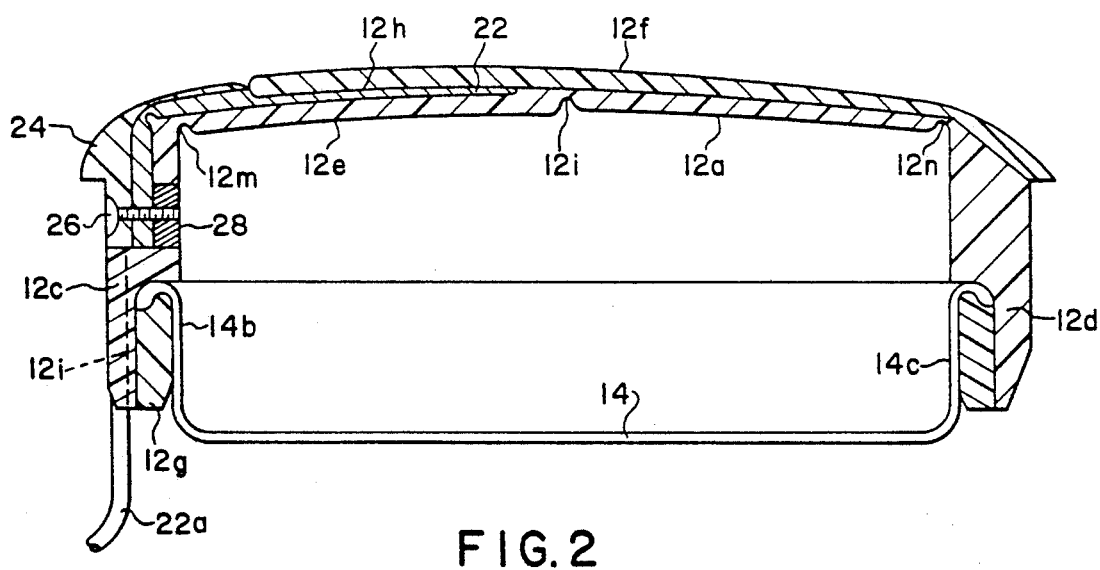
FIG. 2 is a side view section of the module cover of FIG. 1, the inflator, air bag and retaining plate being omitted, and shows in greater detail the membrane horn switch assembly, the solid reinforcement material, and the soft outer cover material.
Figure 3:
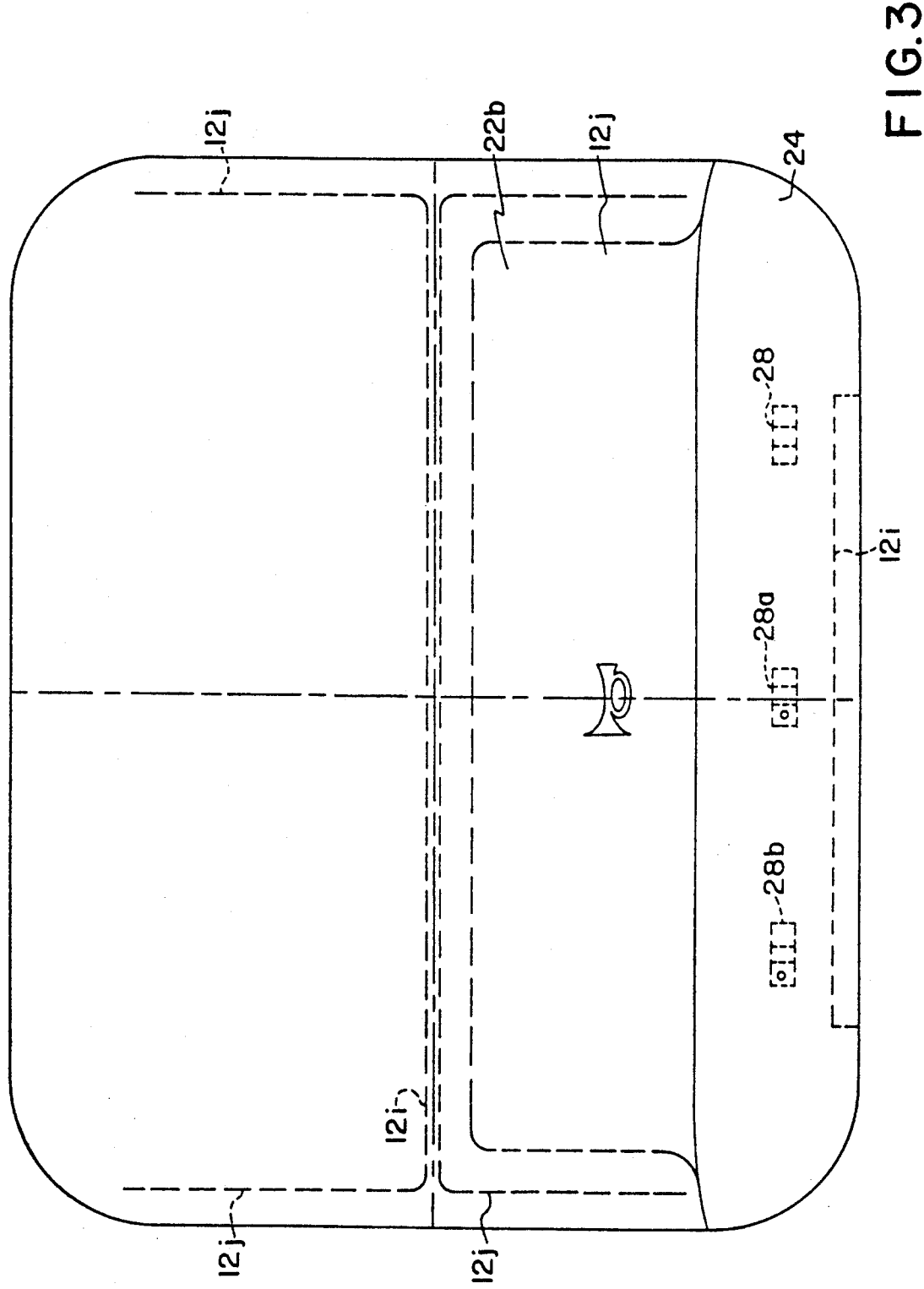
FIG. 3 is a top plan view of the cover of the modular occupant restraint system of FIGS. 1 and 2.

An inflatable occupant restraint module 10 is illustrated in FIGS. 1-3. The module 10 is encapsulated in a cover or container 12 and includes a supporting member specifically a reaction plate 14 which is press fit in cover 12 and on which are mounted an inflator 16 and an air bag 18. A retaining plate 20 for holding the cover 12 to the reaction plate 14 and the inflator 16 is also provided. The retaining plate 20, typically, is also employed, in known manner, as a bracket for the attachment of the module to the spokes of the steering wheel of a vehicle.

In FIG. 1 the air bag 18 is shown in fragmented form to avoid complicating the drawing. Normally, the air bag 18 is folded and fills the space between the inflator 16 and the inner wall 12a of the cover 12. When initiated, as in response to the onset of a collision, the inflator 16 rapidly generates gas to inflate and expand the air bag 18 to a generally spherical form. To that end a plurality of radial gas exit ports 16a are provided in the upper wall portion 16b of the inflator 16. A flange 16c is provided on an intermediate portion of the inflator 16, as shown, for facilitating the attachment thereof to the reaction plate 14. The flange 16c also facilitates the attachment of the inflator 16 to a circular gas inlet port or opening 18a of the air bag 18, which opening 18a is defined by a retaining ring 18b.

The reaction plate 14 is generally rectangular and deep dish-like in shape and has an opening 14a in the bottom thereof into which from the lower side, the upper portion 16b of the inflator 16 may be inserted until the flange 16c abuts the peripheral region of the reaction plate 14 adjacent the opening 14a. The retaining ring 18b, defining the air bag gas inlet port 18a and abutting the flange 16c of the inflator 16, may be fixedly attached, as by rivets or other suitable means (not shown) to the peripheral region of the opening 14a in the reaction plate 14. The extreme edge 14d of the upstanding side wall 14b of the reaction plate 14 is curled outwardly, as shown, for engaging and being locked in a groove 12b in inner wall 12a in cover 12 when pressed in place therein.

With the inflator 16 and the air bag 18 fixed to the reaction plate 14, as described, the retaining plate 20, which is of generally rectangular and dish-like shape, is provided to hold the cover 12 to the reaction plate 14 and the inflator flange 16c. The retaining plate 20 has an opening (not shown) in the bottom 20a thereof of such size as to allow the lower portion 16d of the inflator 16 to pass therethrough but not the flange 16b. At the periphery of the bottom 20a of the retaining plate 20 a wall 20b projects upwardly with the edge thereof inserted in side wall 12c and 12d of the cover 12. Desirably, the corner 20c of the retaining plate 20 may be rounded or beveled, as shown.

The cover 12 is formed in a rectangular box shape with an upper wall 12e and a side wall extending downward from a periphery of the upper wall 12e, and with the upper wall 12e being thinner than the side wall. In the drawing two sides only, respectively designated 12c and 12d, of the side wall may be seen.

As shown in FIG. 1, the upwardly projecting wall 20b of the retaining plate 20 is pressed in place in the downward depending side wall of cover 12, including sides 12c and 12d. Suitably placed and spaced bolts (not shown) are provided to securely fasten the retaining plate 20 to the flange 16c of the inflator 16 and to the air bag retaining ring 18b whereby the cover 12 is securely fastened to the inflator 16, the air bag 18, the reaction plate 14 and the retaining plate 20.

As best seen in FIG. 2, the cover 12 is made of two kinds of material, specifically solid internal reinforcement material which may be composed of injection molded thermoplastic material, such as that commercially available from Celanese under the trademark RITEFLEX, and soft outer cover material, such as urethane, vinyl and polyester. The soft outer cover material includes an outer upper cover 12f for upper wall 12e and a ring 12g of generally rectangular form which, as shown, is pressed between the depending walls 12c and 12d of the container 12 and the upstanding side walls 14b and 14c of the reaction plate 14. The upper cover 12f of soft material may be provided with a suitable pattern for decorative purposes. The remaining portions of the cover 12, as seen in FIGS. 1 and 2, are made of solid reinforcement material.

In accordance with the invention, the upper wall 12e of the module cover 12 contains a slot or cavity 12h into which a thin horn membrane switch assembly 22 of generally plane rectangular shape is inserted. The slot 12h is formed in the upper surface of the upper wall 12e of solid reinforcement material and thus is positioned underneath the soft outer cover material 12f.

Fixed attachment of the membrane switch assembly 22 to the module 10 and the removal therefrom for repair and replacement are facilitated by the use of an elongated styling bar 24 the cross section of which is generally a right angle. The bar 24, as shown in FIG. 2, has a cross section approximating a right angle and is coextensive in length with the upper corner of the module 10 that is opposite to that to which it is attached. The bar 24 is configured to match such opposite corner of the module in appearance. The bar 24, and thereby the membrane switch assembly 22, is attached to the side wall 12c of the module cover 12 by means of bolts 26 which are threaded into nuts 28, 28a and 28b, as indicated in dotted lines in FIG. 3, which are molded into the switch reinforcement material of the wall 12c of the cover 12. The number and location of the nuts 28, 28a and 28b may vary, enabling, if desired, the placement of several membrane switches in side-by-side relation. For facilitating the attachment of each membrane switch assembly 22 to the cover 12, the end of the switch that is attached to the side wall 12c of the cover 12 is bent at approximately a right angle, as shown.

A switch wiring mounting cavity 12i is provided in the side wall 12c of the cover 12, as indicated in FIGS. 2 and 3. Electrical conducting leads or wires 22a of the membrane switch 22 pass through the cavity 12i to a connector (not shown) for connection of the switch 22 to the horn circuit within the vehicle.

The horn actuation area of the membrane switch assembly 22 is indicated at 22b in the bottom of the decorative cover 12f, as seen in FIG. 3. For certain cover styling shapes, it will be understood that a membrane switch assembly 22 may be installed in both the top and bottom areas of the cover 12f. Or if desired, more than one membrane switch assembly 22 may be provided in each area. Also, the styling feature involving the bar 24 can be eliminated and the horn switch assembly or assemblies can be installed through the bottom edge of the cover 12f.

While the membrane switch assembly 22 has been described as a horn switch assembly, it is contemplated that such switch assembly or assemblies may be used for other switch purposes in the vehicle including control of the headlights, vehicle inner lighting, radio, telephone, air conditioner and the like, thus providing easy access to the driver for the control of these and other functions typically involved in the operation of vehicles.

As shown in FIGS. 2 and 3 the upper wall 12e made of solid reinforcement material and the soft outer cover 12f are each provided with a break-open area defined by tear seams 12i and 12j, respectively, each of H-like shape. The tear seam 12i, as shown, is approximately centered on the upper wall 12e and runs generally parallel to the elongated styling bar 24. The tear seams 12j run generally perpendicular to the tear seam 12i adjacent opposing side walls of the cover 12.

When the air bag is expanded, the upper wall 12e divides into two separate flaps that open outwardly and oppositely of each other, bending around hinge lines 12m and 12n, as best seen in FIG. 2, to allow the air bag to expand out of the module 10 to provide the desired driver or other occupant protection function. Upon such bending outwardly of flaps, the plane rectangular membrane switch 22 bends around the hinge line 12m. The hinge lines 12m and 12n comprise narrow thinned areas of the inner side of the upper wall 12e adjacent that to which the styling bar 24 is attached and also adjacent the opposing side of the cover 12. When one or more such switches 22 are provided in association with each of the flaps, the switches 22 bend around the hinge line 12m and 12n that is individually associated therewith.

Thus, in accordance with the invention, there has been provided a cover for an inflatable occupant restraint module which cover contains a cavity or slot into which a plane rectangular or membrane horn or other such switch assembly for a vehicle may be inserted. The switch is securely attached to the cover by means of bolts that are threaded into nuts which are molded in a solid reinforcement portion of the cover.

The horn switch/cover assembly according to the invention is characterized by its provision for the following features:

(1) horn actuation by pressing on the cover module outer surface rather than by pressing buttons, effectively allowing center of wheel horn actuation;

(2) horn switch installation following the air bag module assembly process;

(3) horn switch servicing without requiring exposure of the internal components of the air bag module assembly;

(4) horn switch assembly secure attachment with nuts and bolts such that the horn switch will not become airborne upon deployment of the air bag;

(5) the routing of the horn switch wires for easy access and protection; and (6) decorative covering for the air bag, which covering protects the module internal hardware and opens properly during deployment of the air bag.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims and their equivalents.

What is claimed is:

1. An inflatable occupant restraint module cover and integral horn switch with solid reinforcement structure for a motor vehicle comprising:
   an air bag,
   an inflator,
   a reaction plate,
   a box-like cover for said air bag folded up and encased so as to be inflated only when said inflator operates, said cover being an integral structure that includes an upper wall and a side wall extending downward from a periphery of the upper wall with the side wall secured to said reaction plate on which the air bag and inflator are mounted, said inflator and said air bag, said upper wall and said side wall of said cover being made of solid reinforcement material with said upper wall having soft outer cover material on the upper surface thereof and having a defined break-open area for releasing the air bag while leaving part of the peripheral area of the upper wall connected to the side wall when the air bag is expanded, a first slot in the upper surface of the upper wall of said cover beneath said soft outer cover material thereon, said slot being so positioned as not to cross over the defined break-open area into another area of the upper surface of the upper wall of said cover, a membrane switch assembly of generally plane rectangular shape positioned in said first slot, and means for fixedly attaching said membrane switch assembly to a side wall portion on said cover, wherein said means for fixedly attaching said membrane switch assembly to said side wall portion of said cover includes a bar the cross section of which is generally a right angle and which is attached to said side wall portion of said cover and extends along an upper corner of said cover.

2. An inflatable occupant restraint module cover and integral horn switch with reinforcement structure for a motor vehicle as defined in claim 1 and further including a second slot in the side wall of the cover adjacent the first slot in the upper wall of said cover, and electrical leads extending from said membrane switch assembly through said second slot to a position below said cover for attachment to an electric circuit in the motor vehicle.

3. An inflatable occupant restraint module cover and integral horn switch with reinforcement structure for a motor vehicle as defined by claim 2 further including at least one additional slot in the upper surface of the upper wall of said cover beneath said soft outer cover material thereon, said additional slot being so positioned as not to cross over the defined break-open area into another area of the upper surface of the upper wall of said cover, and at least one additional membrane switch assembly of generally plane rectangular shape positioned in said additional slot fixedly attached to a side wall position on said cover with electrical leads therefrom extending through said second slot in the side wall of said cover to a position below said cover for attachment to an electric circuit in the motor vehicle.

4. An inflatable occupant restraint module cover and integral horn switch and reinforcement structure for a motor vehicle comprising:

an air bag,
an inflator,
a reaction plate,
a retaining plate, a box-like cover for said air bag folded up and encased so as to be inflated only when said inflator operates, said cover being an integral structure that includes an upper wall and a side wall extending downward from a periphery of the upper wall with the side wall secured to said reaction plate on which the air bag and inflator are mounted, and additionally being secured to said retaining plate for retaining said cover to said reaction plate, said inflator and said air bag, said upper wall and said side wall of said cover being made of solid reinforcement material with said upper wall having soft outer cover material on the upper surface thereof and having a defined break-open area for releasing the air bag while leaving part of the peripheral area of the upper wall connected to the side wall when the air bag is expanded, a first slot in the upper surface of the upper wall of said cover beneath said soft outer cover material thereon, said slot being so positioned as not to cross over the defined break-open area into another area of the upper surface of the upper wall of said cover, a membrane switch assembly of generally plane rectangular shape positioned in said first slot, and means for fixedly attaching said membrane switch assembly to a side wall portion on said cover, wherein said means for fixedly attaching said membrane switch to a side wall portion of said cover includes an elongated bar that extends along an upper corner of said cover and is attached to said side wall of said cover by nut and bolt means, said bar having an external configuration that matches in general appearance the other upper corners of said cover.

5. An inflatable occupant restraint module cover and integral horn switch with reinforcement structure for a motor vehicle as defined in claim 4 wherein said break-open area of said upper wall of said cover is defined by tear seams in said upper wall, one of which tear seams is approximately centered in said upper wall approximately parallel to said elongated bar and two others of which tear seams are positioned at approximately a right angle to a respectively associated end of said one tear seam adjacent an individually associated side of said upper wall, and wherein hinge means for said break-open area are provided comprising a narrow thinned area in said upper wall adjacent said bar and also adjacent the opposing side wall of said cover.

6. An inflatable occupant restraint module cover and integral horn switch with enforcement structure for a motor vehicle as defined by claim 5, wherein said first slot in said upper wall extends from said bar toward said tear seam that is centered in said upper wall.

7. An inflatable occupant restraint module cover and integral horn switch with solid reinforcement structure for a motor vehicle comprising:

a cover for an air bag folded up and encased so as to be inflated only when an inflator operates, said cover being an integral structure that includes an upper wall and a side wall extending downward from a periphery of the upper wall with the side wall secured to a reaction plate on which the air bag and inflator are mounted, said upper wall and said side wall of said cover being made of solid reinforcement material with said upper wall having soft outer cover material on the upper surface thereof and having a defined break-open area for releasing the air bag while leaving part of the peripheral area of the upper wall outside of the break-open area connected to the side wall when the air bag is expanded, a first slot in the upper surface of the upper wall of said cover beneath said soft outer cover material thereon, said first slot being so positioned as not to cross over the defined break-open area to another area of the upper wall, and a membrane switch assembly of generally plane rectangular shape positioned in said first slot, and means for fixedly attaching said membrane switch assembly to a side wall portion of said cover, wherein the end of said membrane switch assembly that is attached to said side wall portion of said cover in bent at approximately a right angle, and wherein said means for fixedly attaching said membrane switch assembly to said side wall portion of said cover includes a bar that extends along an upper corner of said cover, has a cross section that is generally a right angle, and is attached to said side wall portion of said cover by readily removable means to facilitate repair and replacement of said membrane switch assembly.

8. An inflatable occupant restraint module cover and integral horn switch with solid reinforcement structure for a motor vehicle as defined in claim 7 further including a second slot in the side wall of said cover adjacent the first slot in the upper wall of said cover, and electrical leads extending from said membrane switch through said second slot to a position beneath said cover for connection to an electrical circuit in the motor vehicle.

9. An inflatable occupant restraint module cover and integral horn switch with reinforcement structure for a motor vehicle comprising:

a cover for an air bag folded up and encased so as to be inflated only when an inflator operates, said cover being an integral structure that includes an upper wall and a side wall extending downward from a periphery of the upper wall with the side wall secured to a reaction plate on which the air bag and inflator are mounted, and additionally, being secured to a retaining plate for retaining said cover to the reaction plate, inflator and air bag, said upper wall and said side wall of said cover being made of solid reinforcement material with said upper wall having soft outer cover material on the upper surface thereof and having a defined break-open area for releasing the air bag while leaving part of the peripheral area of the upper wall outside of the break-open area connected to the side wall when the air bag is expanded, a first slot in the upper surface of the upper wall of said cover beneath said soft outer cover material thereon, said first slot being so positioned as not to cross over the defined break-open area to another area of the upper wall, and a membrane switch assembly of generally plane rectangular shape positioned in said first slot, and means for fixedly attaching said membrane switch assembly to a side wall portion of said cover, wherein said means for fixedly attaching said membrane switch to a side wall portion of said cover includes an elongated bar that extends along an upper corner of said cover and is attached to said side wall of said cover by a nut molded in said side wall and a bolt screwed into said nut, said bar having an external configuration matching in general appearance the other corners of said cover.

10. An inflatable occupant restraint module cover and integral horn switch with reinforcement structure for a motor vehicle as defined in claim 9 wherein said break-open area of said upper wall of said cover is defined by tear seams in said upper wall, one of which tear seams is approximately centered in said upper wall approximately parallel to the side of said cover against which said elongated bar is positioned and others of said tear seams are positioned at approximately a right angle to a respectively associated end of said one tear seam adjacent an individually associated side of said upper wall, and wherein hinge means for said break-open area are provided comprising a narrow thinned area in said upper wall adjacent said bar and also adjacent the opposing side wall of said cover.

11. An inflatable occupant restraint module cover and integral horn switch with enforcement structure for a motor vehicle as defined by claim 10, wherein said first slot in said upper wall extends from the side of said cover against which said bar is positioned toward said tear seam that is centered in said upper wall.

12. An inflatable occupant restraint module cover and integral horn switch with reinforcement structure for a motor vehicle as defined by claim 11 further including, a second slot in the side wall of said cover adjacent said first slot in the upper wall of said cover, and electrical leads extending from said membrane switch assembly through said second slot to a position below said cover for attachment to an electric circuit in the motor vehicle.

13. An inflatable occupant restraint module cover and integral horn switch with reinforcement structure for a motor vehicle as defined by claim 12 further including at least one additional slot in the upper surface of the upper wall of said cover beneath said soft outer cover material thereon, said additional slot being so positioned as not to cross over the defined break-open area into another area of the upper surface of the upper wall of said cover, and at least one additional membrane switch assembly of generally plane rectangular shape positioned in said additional slot fixedly attached to a side wall portion on said cover with electrical leads therefrom extending through said second slot in the side wall of said cover to a position below said cover for attachment to an electrical circuit in the motor vehicle.

* * * * *